US012650035B2

(12) United States Patent
Abrahams

(10) Patent No.: US 12,650,035 B2
(45) Date of Patent: Jun. 9, 2026

(54) BICYCLE LOCKING DEVICE

(71) Applicant: PLUS 8 INDUSTRIES LIMITED, Leamington Spa (GB)

(72) Inventor: John Abrahams, Leamington Spa (GB)

(73) Assignee: PLUS 8 INDUSTRIES LIMITED, Leamington Spa (GB)

(*) Notice: Subject to any disclaimer, the term of this patent is extended or adjusted under 35 U.S.C. 154(b) by 52 days.

(21) Appl. No.: 18/684,981

(22) PCT Filed: Aug. 19, 2022

(86) PCT No.: PCT/GB2022/052151
§ 371 (c)(1),
(2) Date: Feb. 20, 2024

(87) PCT Pub. No.: WO2023/021302
PCT Pub. Date: Feb. 23, 2023

(65) Prior Publication Data
US 2024/0344367 A1 Oct. 17, 2024

(30) Foreign Application Priority Data
Aug. 20, 2021 (GB) ..................................... 2111953

(51) Int. Cl.
*E05B 67/06* (2006.01)
*E05B 67/04* (2006.01)
*E05B 15/16* (2006.01)
*E05B 71/00* (2006.01)

(52) U.S. Cl.
CPC ............ *E05B 67/063* (2013.01); *E05B 67/04* (2013.01); *E05B 15/1614* (2013.01); *E05B 71/00* (2013.01)

(58) Field of Classification Search
CPC ........ E05B 67/04; E05B 67/06; E05B 67/063; E05B 67/38; E05B 15/1614; E05B 71/00
See application file for complete search history.

(56) References Cited

U.S. PATENT DOCUMENTS 3,453,846 A 7/1969 Owen et al.
4,226,100 A * 10/1980 Hampton .............. E05B 17/002 70/53
4,799,369 A * 1/1989 Goodson ................. E05B 67/38 70/56

(Continued)

FOREIGN PATENT DOCUMENTS

DE 494178 C 3/1930

OTHER PUBLICATIONS

International search report for PCT application No. PCT/GB2022/052151, dated Nov. 24, 2022, 5 pages.

(Continued)

*Primary Examiner* — Christopher J Boswell
(74) *Attorney, Agent, or Firm* — Smith IP Services, P.C.

(57) ABSTRACT

A bicycle locking device including a shackle with first and second arms, a lockable crossbar releasably engaging the first and second arms to form a closed loop with the shackle. The shackle and crossbar including an inner core, with an outer topside and an outer underside. At least one plate of high performance material is secured to the topside and underside of the shackle and crossbar to sandwich the inner core therebetween. The high performance material is harder and more brittle than the inner core.

18 Claims, 8 Drawing Sheets

(56) References Cited

U.S. PATENT DOCUMENTS

| | | | | | |
|---|---|---|---|---|---|
| 5,146,771 | A * | 9/1992 | Loughlin | E05B 67/38 70/56 |
| 5,303,568 | A | 4/1994 | Wightman | |
| 5,394,712 | A * | 3/1995 | Chou | E05B 67/063 70/226 |
| 6,684,668 | B1 * | 2/2004 | Hsueh Lee | E05B 67/02 70/52 |
| 6,705,134 | B2 | 3/2004 | Miranda | |
| 9,512,640 | B2 * | 12/2016 | Kyllonen | E05B 67/38 |
| 9,890,561 | B2 * | 2/2018 | Perrenoud | E05B 67/063 |
| 10,995,522 | B2 * | 5/2021 | Derman | E05B 67/38 |
| 11,111,699 | B2 * | 9/2021 | Perrenoud | E05B 67/04 |
| 11,255,110 | B2 * | 2/2022 | Fan | E05B 67/38 |
| 2020/0048936 | A1 | 2/2020 | Telang et al. | |

OTHER PUBLICATIONS

Search Report for UK application No. GB2111953.2, dated May 11, 2022, 2 pages.
Written Opinion for PCT application No. PCT/GB2022/052151, dated Nov. 24, 2022, 9 pages.

* cited by examiner

BICYCLE LOCKING DEVICE

CROSS-REFERENCE TO RELATED APPLICATIONS

This application is a national stage under 35 USC 371 of International Application No. PCT/GB2022/052151 filed on 19 Aug. 2022, which claims priority to UK Application No. GB2111953.2 filed on 20 Aug. 2021. The entire disclosures of these prior applications are incorporated herein by this reference.

The invention relates to a bicycle locking device that is resistant to attacks, particularly but not exclusively to attacks by angle-grinders and similar friction-based devices.

A large number of locking devices are commercially available for bicycles. A popular form of such a device is an elongated U-shaped bar or shackle that is passed around the bicycle frame and/or wheel and around a secure post or stand. The end of the U-shaped bar is closed and locked with a straight crossbar that engages the ends of the U-shaped bar to form an elongated D-shaped lock. Such an arrangement is commonly known as a D-lock.

D-locks are strong and compact and, as such, an effective deterrent to thieves. They are, though, still vulnerable to determined attack with an angle grinder or other such coarse grit cutting wheel.

To resist angle-grinder attack, it is known for the shackle and crossbar of D-lock devices to comprise one or more materials with differing properties.

WO2020056289A1, for example, provides a D-shaped lock with an external shell made from a relatively soft metal that clogs grindings disks and reduces their cutting effectiveness.

It is an object of WO2020056289A1 to provide a shackle protector that helps to protect the shackle of a D-lock by a shell material that is softer than the shackle steel and that acts to clog the cutting grit of a grinder. The lock comprises a U-shaped shackle made of a hardened metal. The shackle shell, however, is made substantially, if not completely, from a material that is softer than the shackle steel but which is of a nature and thickness that is sufficient to clog a coarse grit cutting wheel and reduce its cutting efficiency when trying to cut the shackle. Suitable materials include aluminium, aluminium alloys, aluminium-containing polymeric composites, and brass, although aluminium and its alloys are preferred.

A grinder is allowed to cut the outer layer, in order that this layer clogs and subsequently disables a grinder attack. The outer layer is therefore sacrificial.

WO2020023423A1 is a second piece of prior art which discloses providing a shackle and crossbar comprising differing materials of differing properties.

WO2020023423A1 discloses a device comprising a locking portion and a housing portion. The housing portion comprises a first material which surrounds a second material. The second material is made of a different material than the first material and is selected such that a cutting tool will be hindered when trying to cut through the housing portion.

This is similar, therefore, to WO2020056289A1, in that a more easy to cut material surrounds a harder, more resistant, core.

An embodiment is disclosed wherein an airborne deterrent is released into the atmosphere to cause an effect on a thief so as to stop the thief from continuing. There is also an embodiment disclosed wherein if a thief tries to grind or break through the lock, the angle grinder, for example, breaks or is prevented from cutting through the lock due to the presence of a second material layer.

The problem with both of these prior art solutions is that they become significantly damaged and compromised following an angle-grinder attack.

It is apparent that there is still need for improvement in devices for locking bicycles.

The present invention concerns a bicycle locking device as defined in the appended independent apparatus claim. Further preferable features of the locking device of the present invention are defined in the appended dependent apparatus claims.

The bicycle locking device comprises a shackle comprising first and second arms, a lockable crossbar releasably engaging a free end of the first and second arms to form a closed loop with the shackle, the shackle and crossbar comprising an inner core, with an outer topside parallel to an outer underside, and characterised in that plates of high performance material are secured to the topside and underside of the shackle and crossbar to sandwich the inner core therebetween, and wherein the inner core is made from a material less brittle than the high performance material secured thereto.

The high performance material is designed to withstand angle grinders/abrasive cutting by wearing away grinding disks when under attack. In contrast, the inner core material is designed to withstand attacks against compression/crushing or heavy impacts such as bolt croppers or hammer attacks. The inner core is steel and is hardened to withstand these heavy impacts, but not so hard that it is as brittle as the high performance material. The inner core can withstand bolt cropping and hammer attacks even at very low temperatures.

Such a device differs from the prior art, at least, discussed above in that the harder material surrounds a less resistant core. The technical advantage of this is that it enables less of the more expensive, grinder resistant, material to be used to achieve the desired effect. It is also arguably easier to manufacture locks of varying strength by layering the more resistant material onto a standard core lock, or using thicker pieces of the more resistant material. Thus locks for different purposes and markets can be made more easily, e.g. for children's bikes, up to motorbikes.

One continuous piece of more resistant material does not have to be manufactured either, because they can be layered onto the less resistant core. Locks which use a more resistant core can be built up from that core when being manufacture, i.e. a single U-shaped resistant core is made and then covered in less resistant material. The present invention has the technical advantage of being able to use small, discrete, pieces of very resistant material fixed to the topside and underside of the outer face of the shackle and crossbar. This is rather than using a single piece of material that may be comparably more expensive to manufacture.

Angle grinder attacks can be resisted by use of a relatively thin amount of very strong, hard, material. As such, the locks of the present invention comprising the high performance material are not prohibitively expensive.

The present invention is a high security D-lock. The lock uses a very high performance and relatively expensive material which sandwiches less high performance, and thus less expensive material.

The high performance material is resistant to angle-grinder attacks, but is brittle. Arranging it in a sandwich manner uses less material and prevents an angle grinder from being able to cut through the lock. The high performance material is secured in plates to the top and bottom of the U-shaped loop of the D-lock and to the top and bottom of straight crossbar part of the D-lock. When fastened together, a closed loop of high performance material is created. Alternatively, the high performance material could be used even more sparingly by securing it only to three of the four corner vertices of the D-lock. It will of course be understood that the D-lock could be manufactured to any size to accommodate securing a multitude of articles.

A better understanding of the present invention will be obtained from the following detailed description of a preferred embodiment. The description is given by way of example only and makes reference to the accompanying drawings, in which.

The orientations top, side, above, below etc. are taken from an arbitrary datum and are intended solely to simplify the description below.

Figure 1:
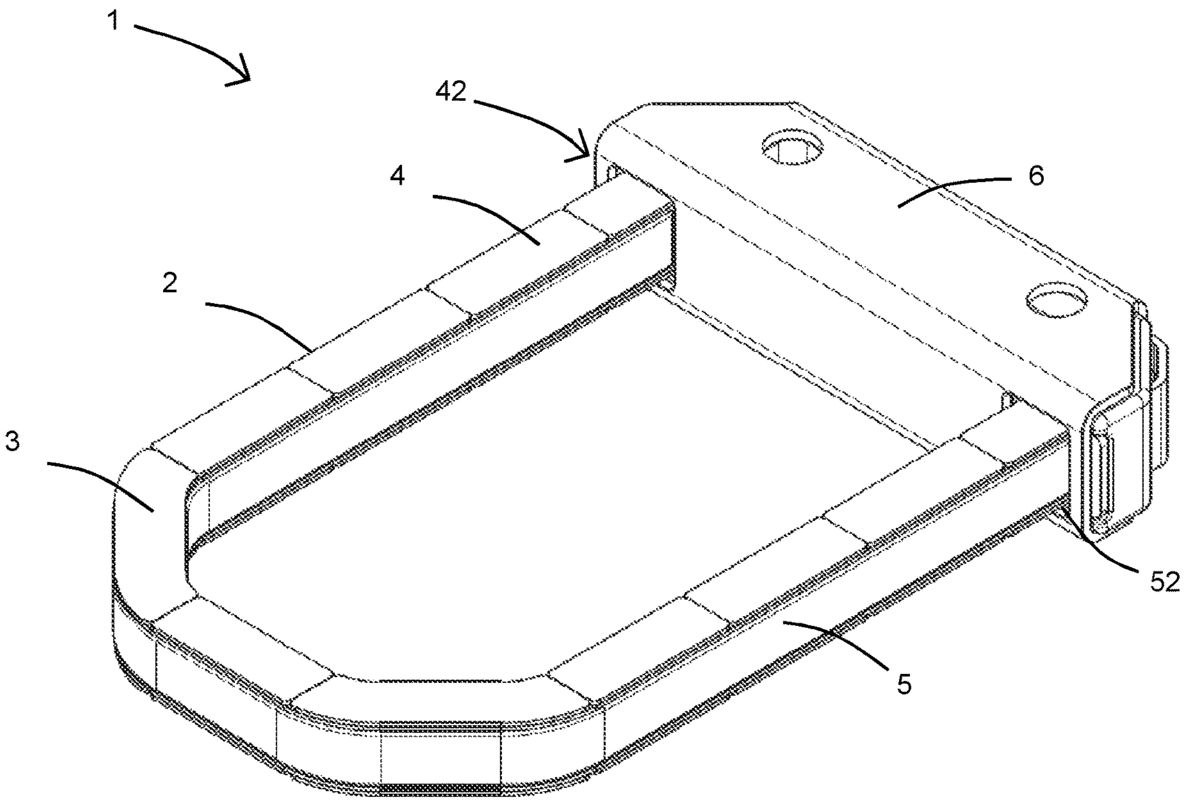
FIG. 1 is a perspective view of a bicycle locking device according a first embodiment of the present invention.
Figure 2:
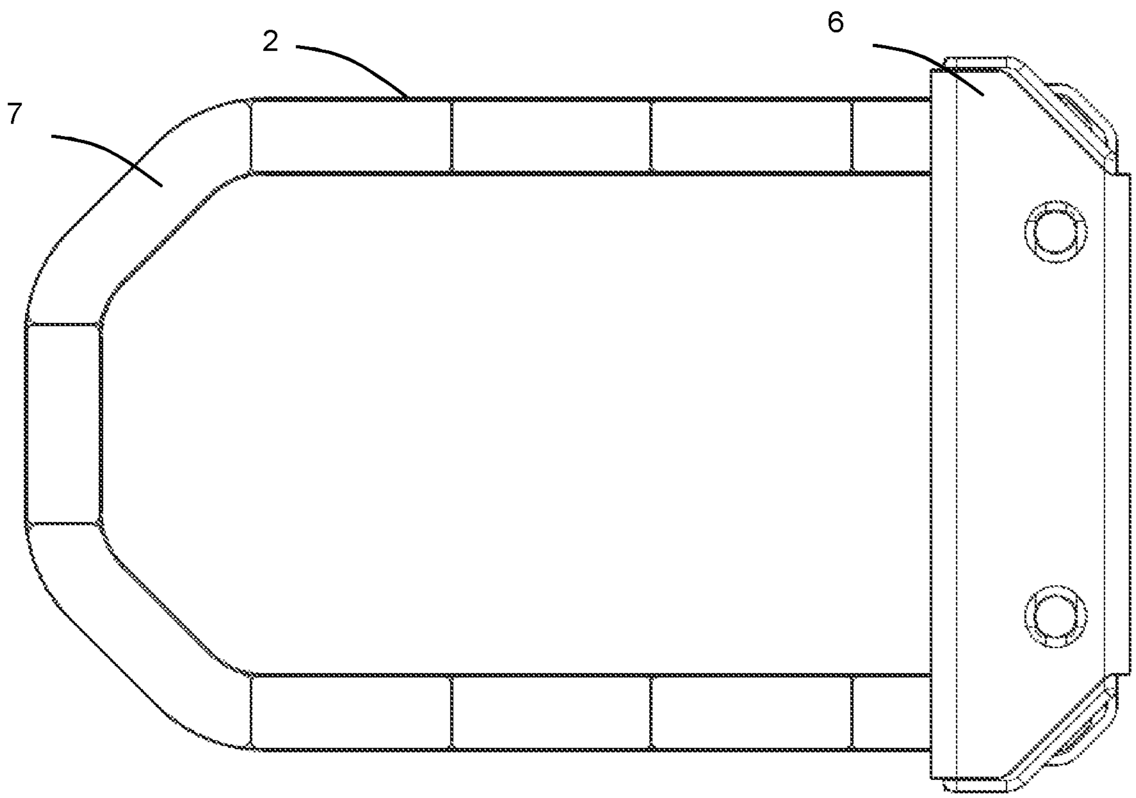
FIG. 2 is a plan view of the bicycle locking device of FIG. 1 in a locked configuration.
Figure 3:
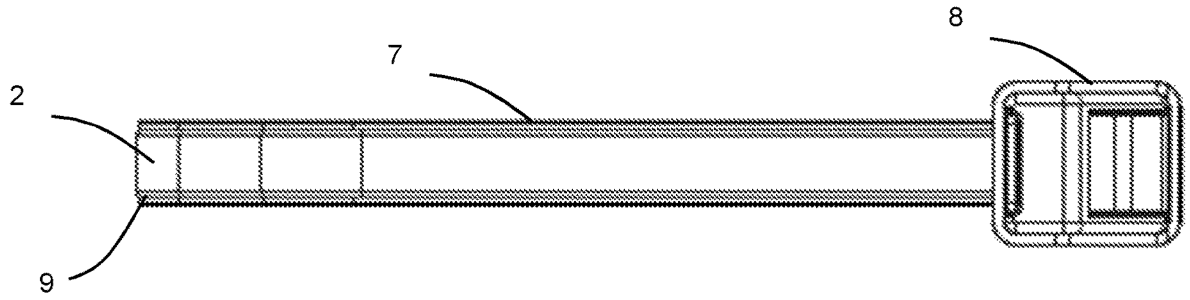
FIG. 3 is a side view of the bicycle locking device of FIG. 1 in a locked configuration.

Referring firstly to FIG. 1, this shows a perspective view of the bicycle locking device 1 of the present invention.

Figure 4:
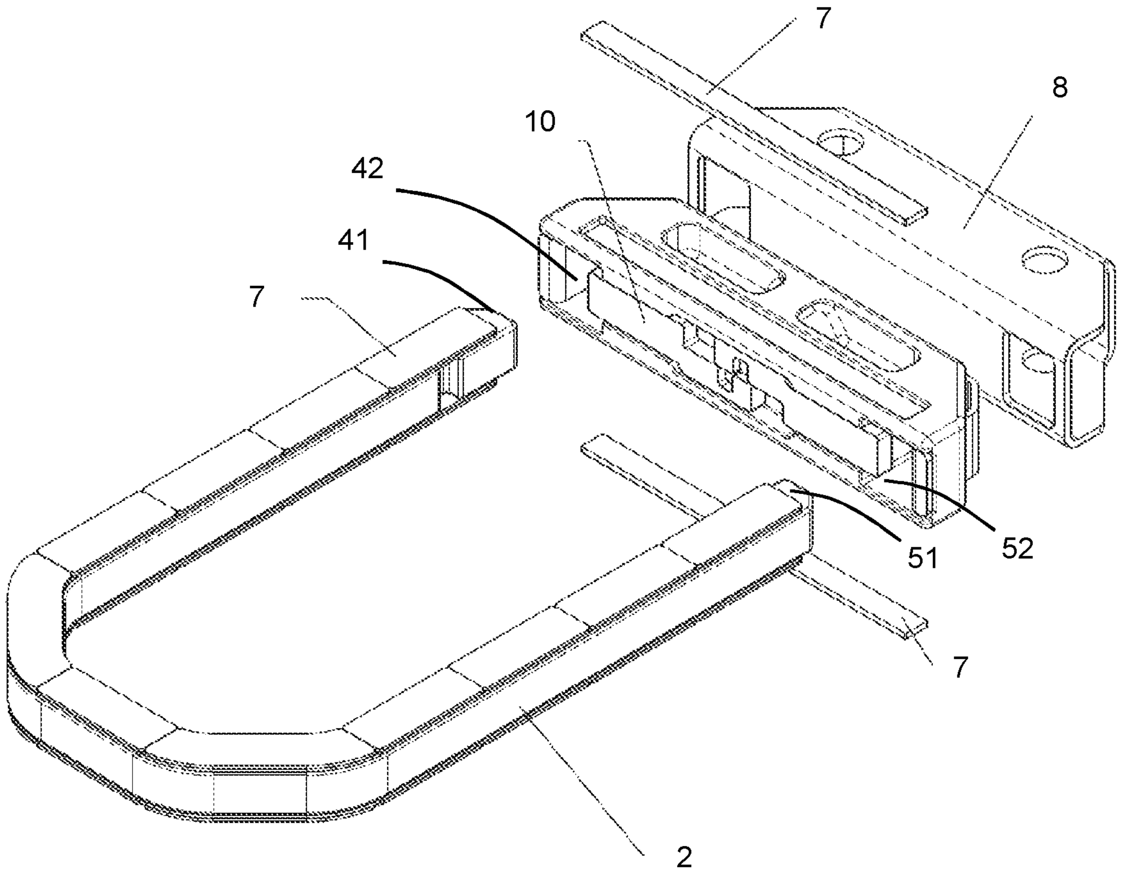
FIG. 4 is an exploded view of the bicycle locking device of FIG. 1 in an unlocked configuration.
Figure 5:
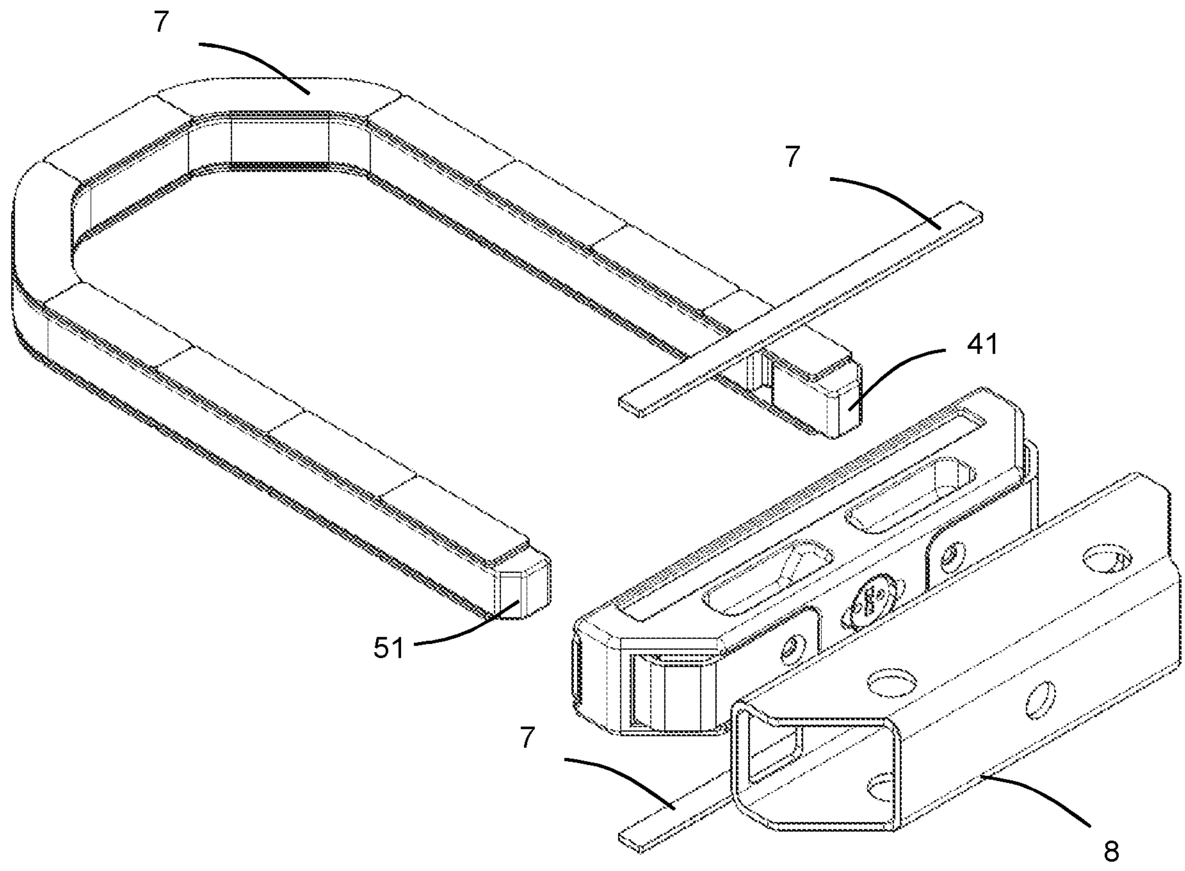
FIG. 5 is an alternative exploded view of the bicycle locking device of FIG. 1 in an unlocked configuration.
Figure 8:
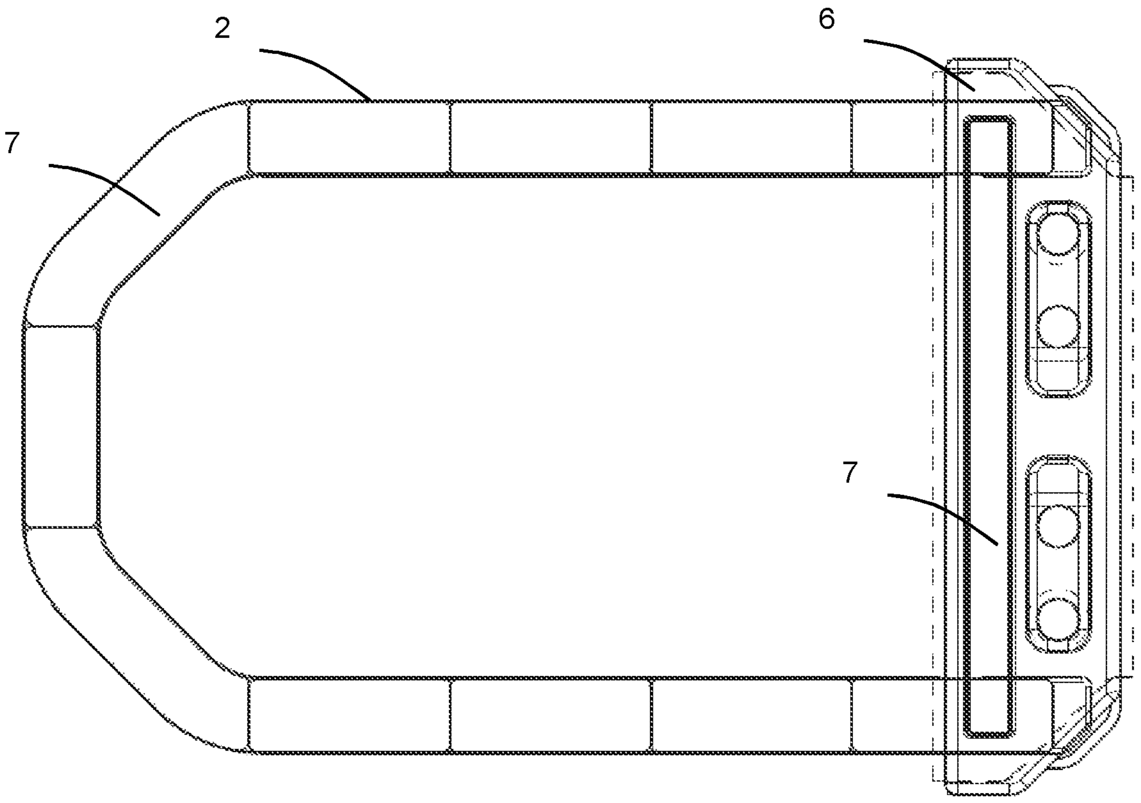
FIG. 8 is a plan view of the bicycle locking device of FIG. 1 showing the internal arrangement of the crossbar.

The device 1 has a U-shaped shackle 2 comprising a curved portion 3 and two parallel arms 4, 5, extending in the same direction and in the same plane. The first arm 4 has a free end 41 and the second arm 5 has a free end 51 (shown best in FIG. 4). These male free ends 41, 51, fasten into complimentary female recesses 42, 52, positioned in a crossbar 6, which connects to the shackle to form a closed loop (shown best in FIG. 8). It is into this closed loop a bicycle is secured. A conventional D-lock locking mechanism 10 is used between the crossbar 6 and the U-shaped shackle 2.

The shackle 2 is made from hardened steel and is approximately square in cross-section. As can be seen best in FIG. 4, discrete pieces of high performance material 7 are fastened to the uppermost, topside of the shackle 2, and to the opposing underside of the shackle 2. Within the crossbar 6, a further, single piece of high performance material 7 is fastened across the topside of the free ends 41, 51 of the shackle 2 and another single piece fastened across the underside of the free ends 41, 51 of the shackle 2 such that when the lockable crossbar 6 is secured to the shackle 2, a closed loop of high performance material 7 is formed. The high performance material 7 on the crossbar 6 is enclosed in a hardened steel casing 8. This casing 8 surrounds the entire crossbar 6.

Figure 6:
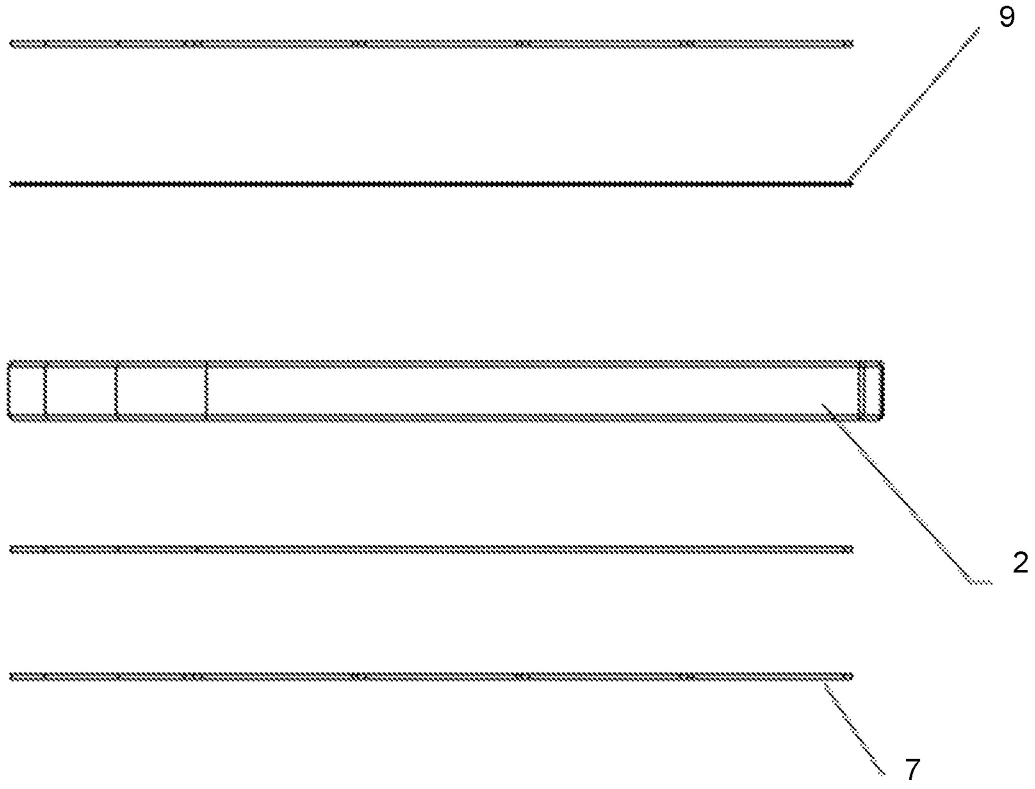
FIG. 6 is an exploded side view of the shackle of the bicycle locking device of FIG. 1.
Figure 7:
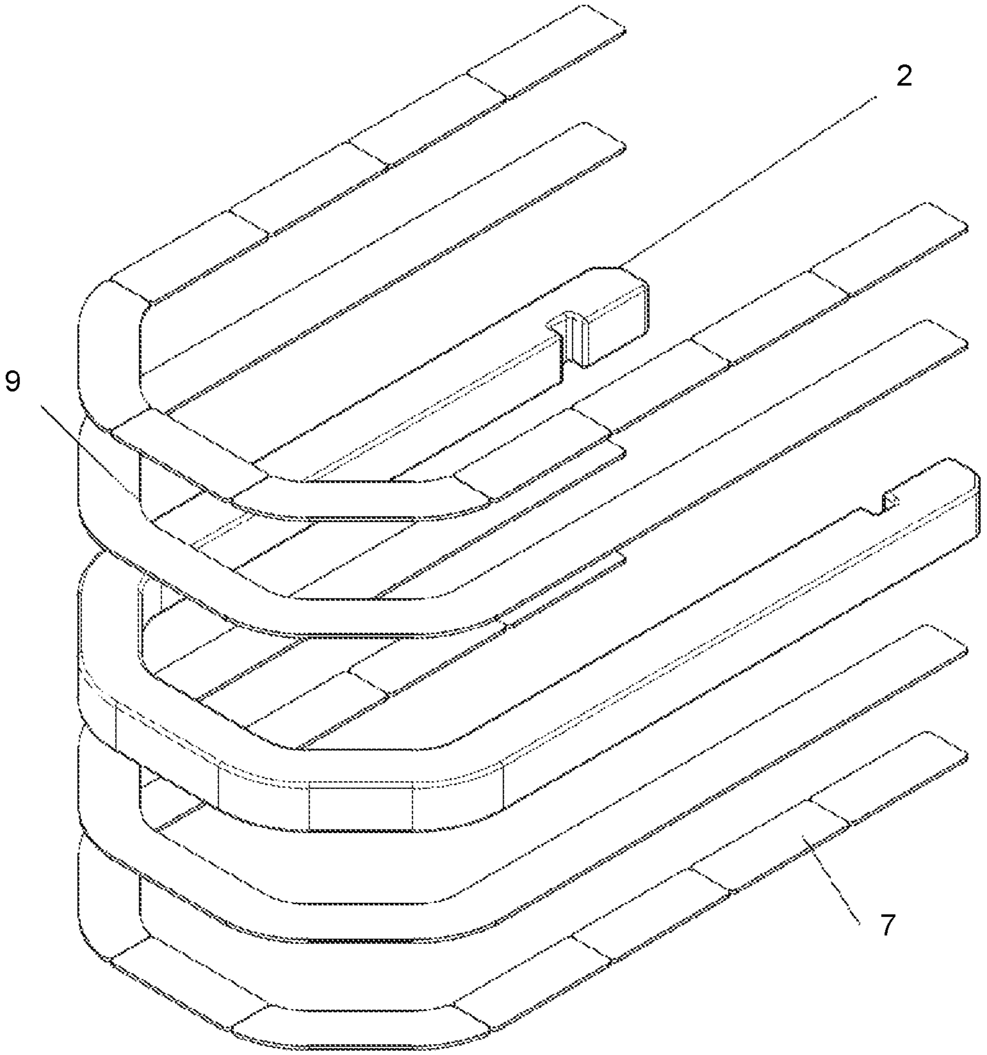
FIG. 7 is an exploded view of the shackle of the bicycle locking device of FIG. 1.

Shown best in FIGS. 6 and 7, a steel plate 9 is sandwiched between the hardened steel shackle 2 and the high performance material 7. This provides further protection against attack.

The steel plate 9 and discrete pieces of high performance material 7 can be bonded to the shackle 2 using a high performance glue or resin.

The high performance material 7 may be more brittle than the hardened steel of the shackle 2, but it provides comprehensive protection against angle grinder attack. The steel plate 9 combined with the hardened steel shackle 2 provide protection against the other common forms of destructive attack, such as cutting devices. In combination, the high performance material 7, steel plate 9 and steel shackle 2 provide very high resistance to destructive attack, whilst use of small, discrete, pieces of high performance material 7 fixed to the outer face of the shackle and to the crossbar 6 as described enables this level of protection to be achieved with a minimal use of the high performance material 7. This is advantageous because the high performance material 7, which is harder and more resistant to angle grinder attack than the steel plate 9 and shackle 2, is relatively expensive and so minimal use enables the D-lock to be produced in a cost effective manner.

This means the high performance locking device of the present invention can be marketed at bicycle owners, and not just at the more high-end motorcycle owners.

The invention claimed is:

1. A bicycle locking device comprising:

a D-lock for locking the bicycle, the D-lock comprising:
- a shackle comprising first and second arms;
- a lockable crossbar releasably engaging the first and second arms to form a closed loop with the shackle;
- the shackle and the crossbar comprising an inner core, with an outer topside and an outer underside, wherein at least one plate of high performance material is secured to the topside of the shackle and the crossbar, and at least one plate of high performance material is secured to the underside of the shackle and the crossbar, to sandwich the inner core therebetween, wherein the inner core is configured to withstand at least one of compression and cutting attacks, wherein the high performance material is harder and more brittle than the inner core, and the high performance material is configured to withstand an abrasive cutting attack, and wherein a steel plate is sandwiched between the high performance material and the shackle.

2. The bicycle locking device of claim 1, wherein the lockable crossbar releasably engages a free end of the first and second arms to form a closed loop with the shackle.

3. The bicycle locking device of claim 1, wherein, when fastened together, a closed loop of high performance material is created.

4. The bicycle locking device of claim 1, wherein the shackle is U-shaped.

5. The bicycle locking device of claim 1, wherein the D-lock is formed when the crossbar is fastened to the shackle.

6. The bicycle locking device of claim 1, wherein the topside and underside of the shackle and crossbar are parallel.

7. The bicycle locking device of claim 1, wherein the high performance material forms a continuous loop along the topside and underside of the shackle and crossbar.

8. The bicycle locking device of claim 1, wherein the high performance material is secured to at least three of the four corner vertices of the shackle and crossbar.

9. The bicycle locking device of claim 1, wherein the high performance material is bonded to the shackle via a glue or resin.

10. The bicycle locking device of claim 1, wherein a single piece of high performance material runs the length of the crossbar such that, when the crossbar is connected to the shackle, the single piece of high performance material forms part of a continuous loop of high performance material.

11. The bicycle locking device of claim 1, wherein two parallel pieces of high performance material run along the length of the crossbar such that, when the crossbar is connected to the shackle, the high performance material forms part of a continuous loop of high performance material along both the topside and underside of the locking device.

12. The bicycle locking device of claim 1, wherein the first arm comprises four pieces of high performance material on the topside and four pieces of high performance material on the underside, the second arm comprises four pieces of high performance material on the topside and four pieces of high performance material on the underside, and the curved portion of the U-shaped shackle comprises three pieces of high performance material on the topside and three pieces of high performance material on the underside.

13. The bicycle locking device of claim 1, wherein the pieces of high performance material positioned on the straight portions of the U-shaped shackle are rectangular.

14. The bicycle locking device of claim 1, comprising curved pieces of high performance material position positioned on the curved portion of the U-shaped shackle.

15. The bicycle locking device of claim 1, wherein the topside and underside of the shackle are opposite to each other with the inner core therebetween.

16. The bicycle locking device of claim 1, wherein the topside and underside of the crossbar are opposite to each other with the inner core therebetween.

17. A bicycle locking device comprising:

a D-lock for locking the bicycle, the D-lock comprising:

a shackle comprising first and second arms;

a lockable crossbar releasably engaging the first and second arms to form a closed loop with the shackle;

the shackle and the crossbar comprising an inner core, with an outer topside and an outer underside, wherein at least one plate of high performance material is secured to the topside of the shackle and the crossbar, and at least one plate of high performance material is secured to the underside of the shackle and the crossbar, to sandwich the inner core therebetween, wherein the inner core is configured to withstand at least one of compression and cutting attacks, wherein the high performance material is harder and more brittle than the inner core, and the high performance material is configured to withstand an abrasive cutting attack, and wherein a hardened steel shell encloses the crossbar.

18. The bicycle locking device according to claim 17, wherein the hardened steel shell encloses high performance material contained within the crossbar.

* * * * *